United States Patent [19]

Hara et al.

[11] Patent Number: 5,454,028

[45] Date of Patent: Sep. 26, 1995

[54] CORDLESS KEY TELEPHONE SYSTEM HAVING ZONE SWITCHING FUNCTION

[75] Inventors: Toshihiro Hara; Shinji Kumataka; Kosuke Hashimoto; Ichiro Tamura, all of Tokyo, Japan

[73] Assignees: NEC Corporation; Nippon Telegraph and Telephone Corporation, both of Tokyo, Japan

[21] Appl. No.: 187,315

[22] Filed: Jan. 27, 1994

Related U.S. Application Data

[63] Continuation of Ser. No. 757,756, Sep. 11, 1991, abandoned.

[30] Foreign Application Priority Data

Sep. 11, 1990 [JP] Japan .................................. 2-238964
Sep. 11, 1990 [JP] Japan .................................. 2-238965

[51] Int. Cl.$^6$ .................................................. H04M 11/00
[52] U.S. Cl. .................. 379/61; 379/58; 379/59; 379/60; 379/63
[58] Field of Search ...................... 379/58–61, 63; 455/33.1, 33.2, 33.4, 34.2, 53.1, 54.1, 54.27, 56.1

[56] References Cited

U.S. PATENT DOCUMENTS

| | | | |
|---|---|---|---|
| 4,748,655 | 5/1988 | Thrower et al. | 379/60 |
| 4,926,421 | 5/1990 | Kawano et al. | 455/56.1 |
| 5,111,535 | 5/1992 | Tokunaga | 455/33.2 |

FOREIGN PATENT DOCUMENTS

| | | |
|---|---|---|
| 0325713 | 8/1989 | European Pat. Off. |
| 0443503 | 8/1991 | European Pat. Off. |
| 55-95438 | 7/1980 | Japan ............ 379/60 |
| 0051831 | 2/1989 | Japan ............ 379/60 |

OTHER PUBLICATIONS

Patent Abstracts of Japan, vol. 004, No. 145, 19 Jul. 1980.
Ericsson Product Brochure for CT3., Feb. 1990.

*Primary Examiner*—Curtis Kuntz
*Assistant Examiner*—G. J. Oehling
*Attorney, Agent, or Firm*—Sughrue, Mion, Zinn, Macpeak & Seas

[57] ABSTRACT

In a cordless key telephone system for servicing separate service zones ($3_1$, $3_2$), a cordless station (5) establishes a two-way radio channel with an access unit (4) of the service zone in which it is located, and constantly monitors the field intensity of the established channel and transmits a zone switching signal when the field intensity is below a specified level as an indication that the cordless station is leaving a first zone ($3_1$) and entering a second zone ($3_2$). A main controller (2) establishes a switched connection between exchange lines (6) and the access units (4). In response to the zone switching signal from a given cordless station via the access unit of the first zone, the main controller holds an exchange line ($6_i$) that is connected to the access unit ($4_j$) of the first zone through a first switched connection, and establishes a second switched connection between the exchange line ($6_i$) and the access unit ($4_j$) of the second zone, instead of the first switched connection. A vocal announcement is applied to the exchange line indicating to a communicating party that the cordless station is switching zones.

2 Claims, 10 Drawing Sheets

ACCESS UNIT 4

CORDLESS STATION 5

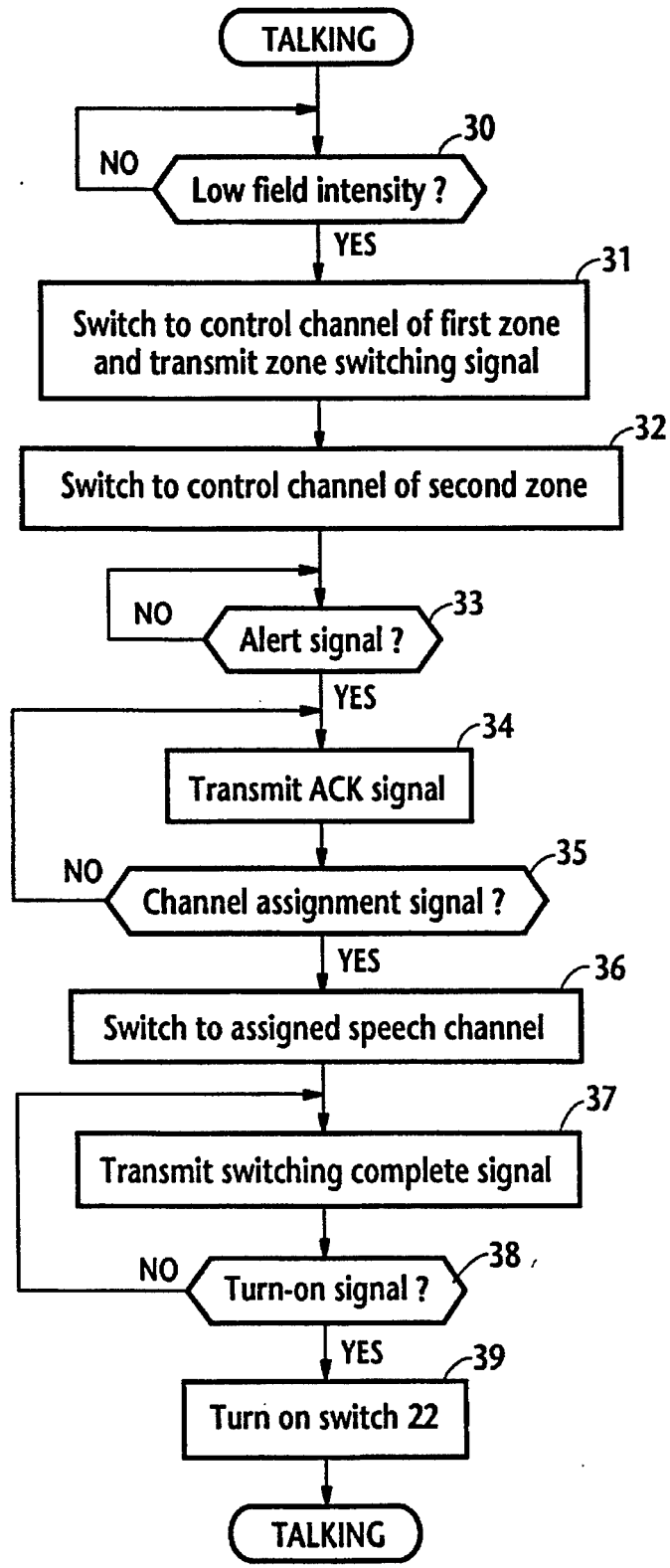

ACCESS UNIT 4

ACCESS UNIT 4

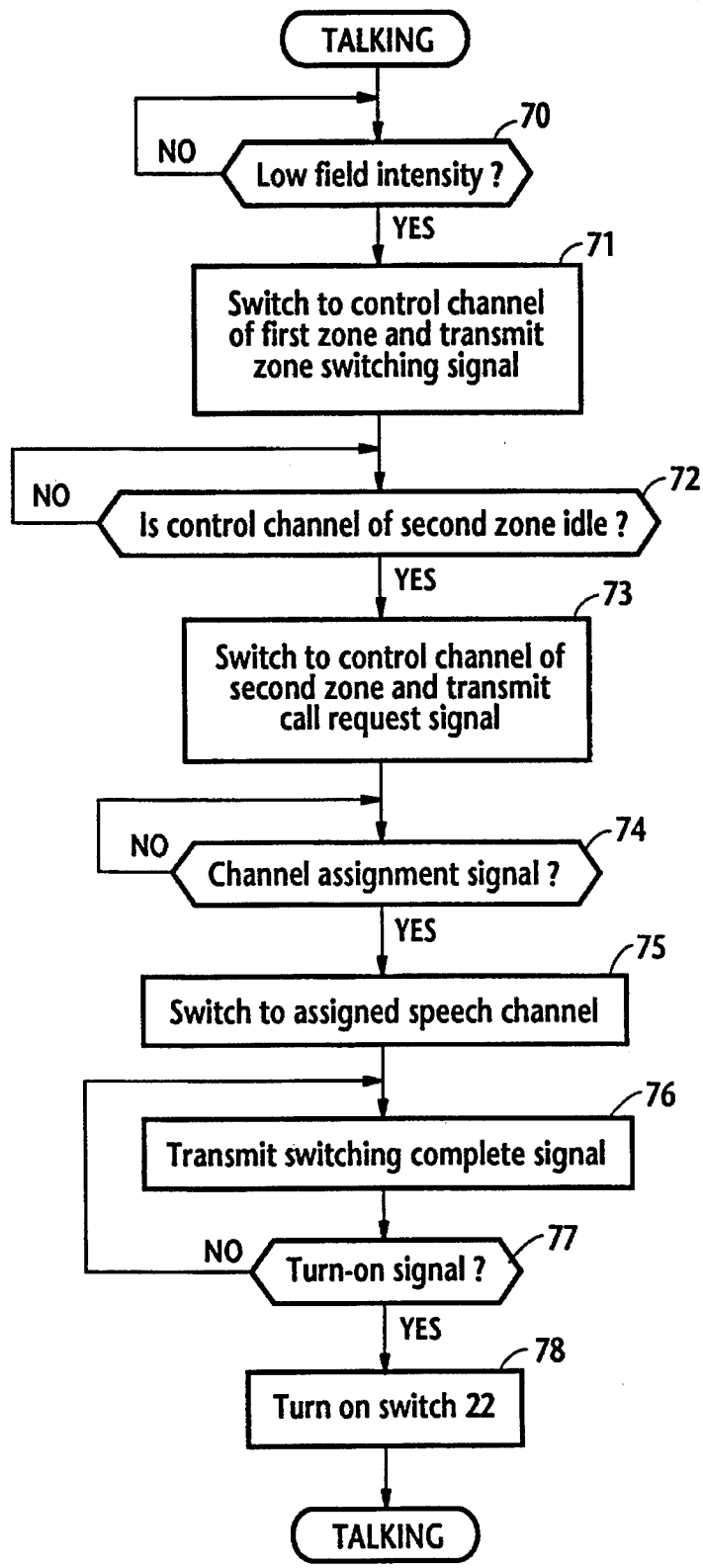

ACCESS UNIT 4

ACCESS UNIT 4

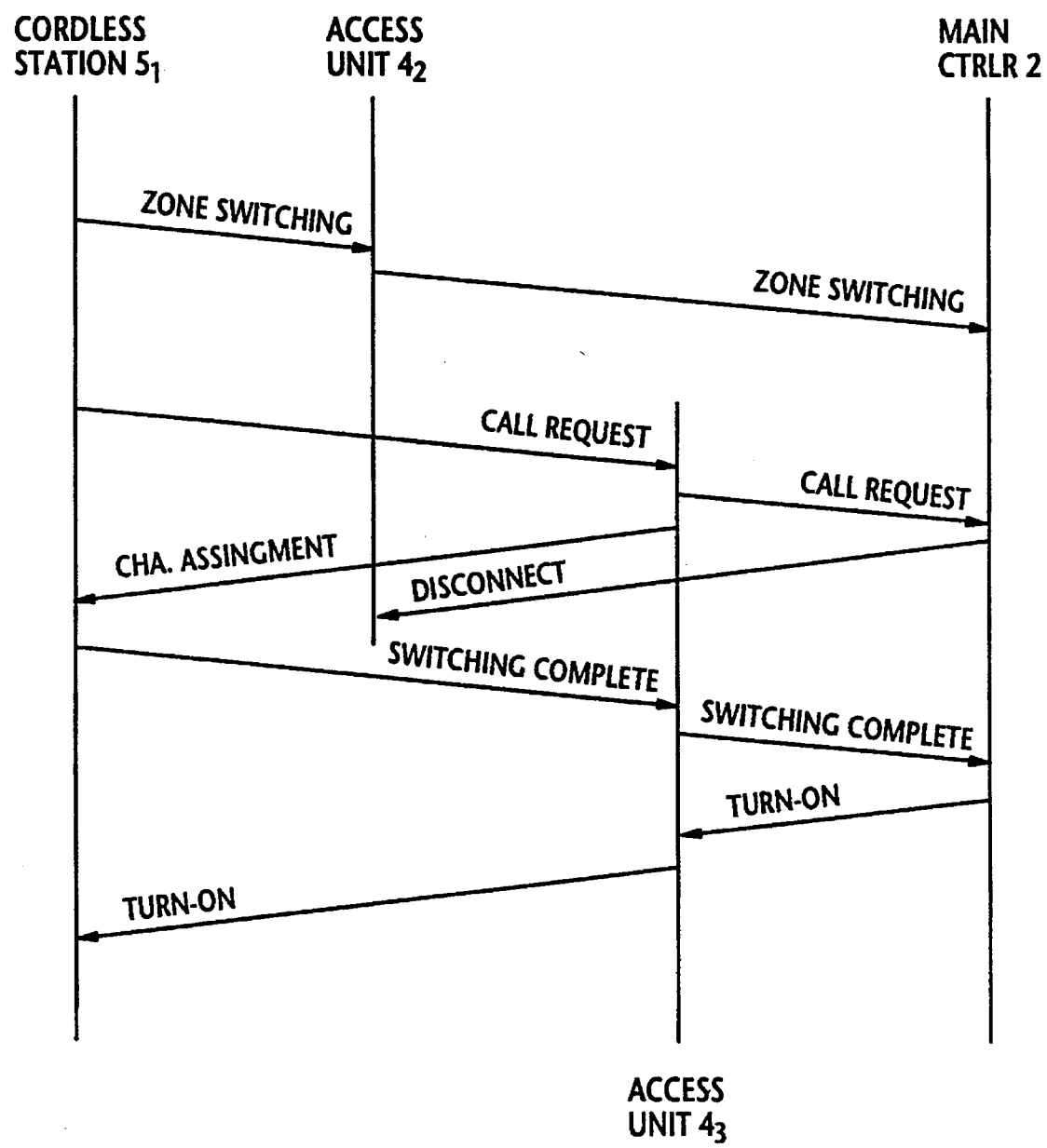

CORDLESS KEY TELEPHONE SYSTEM HAVING ZONE SWITCHING FUNCTION

This is a Continuation of application Ser. No. 07/757,756 filed Sep. 11, 1991, now abandoned.

RELATED APPLICATIONS

This application is related to the following U.S. patent applications issued to the same assignee as the present application:
1) Ser. No. 07/686,468, filed Apr. 17, 1991, now U.S. Pat. No. 5,239,572;
2) Ser. No. 07/686,469, filed Apr. 17, 1991, now U.S. Pat. No. 5,283,817;
3) Ser. No. 07/690,417, filed Apr. 24, 1991, now U.S. Pat. No. 5,384,827.

BACKGROUND OF THE INVENTION

The present invention relates to a cordless key telephone system.

Cordless key telephone systems have been in widespread use replacing wired key telephone systems to reduce the amount of cables and wires laid on office floors. The system usually includes a main controller which is coupled to the public or private switched telephone network via exchange lines to receive incoming calls and originate outgoing calls. The floor space is divided into several service zones to which control channels are uniquely assigned. One or more access units are located in each service zone, and are coupled to the main controller to relay control signals between it and the cordless stations before establishing a connection through a speech channel. The cordless station is provided with a field intensity detector for alerting the user when the field intensity drops below an acceptable level. When the user of a given cordless station is in conversation with a distant network-side party via an exchange line while walking across a boundary between adjacent zones, the user will be alerted by the field intensity detector and would request the distant party to wait for a moment, and depress a "hold" key to trigger a signal. The main controller receives this signal to hold the exchange line and sends back a signal to the cordless station to give a visual indication to the user, indicating that the exchange line is kept in a line-hold mode, while triggering a timeout circuit to measure the length of time in which the line-hold mode is continued. If a prescribed period expires the exchange line is forcibly disconnected. Upon seeing the visual indication, the user is supposed to depress an end-of-call key to allow the cordless station to switch to standby mode. The end-of-call key causes a signal to be transmitted to the main controller to record the status of the call in a call status memory, so that the exchange line can be accessed exclusively from the cordless station. On entering the second zone, the station user is supposed to depress a call request key signalling the origination of a call to an access unit of the second zone, and thence to the main controller. On receiving the call request, the access unit searches speech channels to assign an idle channel and returns a channel assignment signal to the cordless station to cause it to switch to the assigned channel. On the other hand, the main controller responds to the call request by accessing the call status memory and establishing a connection between the exchange line and the access unit of the second zone according to the recorded call status.

Since the conventional cordless key telephone system processes zone switching events in response to manual key commands, delayed operations of the keys may inadvertently allow the timeout circuit to disconnect the exchange line, leaving the network-side party in a state of embarrassment.

SUMMARY OF THE INVENTION

It is therefore an object of the present invention to provide a cordless key telephone system having multiple control channels assigned respectively to different service zones, wherein the station users are allowed to move across a zone boundary while keeping a call with a network-side user without bothering to enter key commands.

According to the present invention, there is provided a cordless key telephone system for covering a plurality of service zones. The system includes a plurality of access units respectively located in the service zones. A plurality of cordless stations are located in the service zones. Each cordless station establishes a two-way radio channel with the access unit of the service zone in which it is located, constantly monitors the field intensity of the established channel, and transmits a zone switching signal when the field intensity is below a specified level as an indication that the cordless station is leaving a first service zone and entering a second service zone. A main controller establishes a switched connection between exchange lines and the access units and is responsive to the zone switching signal from a given cordless station via the access unit of the first service zone for holding an exchange line that is connected to the access unit of the first service zone through a first switched connection, and establishes a second switched connection between the exchange line and the access unit of the second service zone, instead of the first switched connection.

In one embodiment of the present invention, the main controller is responsive to the zone switching signal for transmitting a disconnect signal to the access unit of the first service zone and transmitting an alert signal to the given cordless station via the access unit of the second service zone to elicit an acknowledgment signal therefrom. The access unit of the first service zone is responsive to the disconnect signal for clearing the channel established therefrom to the given cordless station for readying to receive signals in a standby mode, and the access unit of the second service zone is responsive to the acknowledgment signal for transmitting to the given cordless station a channel assignment signal indicating an idle speech channel to be assigned to the given cordless station.

In another embodiment of the present invention, the cordless station transmits a call request signal to the access unit of the second service zone following the transmission of the zone switching signal. The access unit of the second service zone is responsive to the call request signal for transmitting to the cordless station a channel assignment signal. The main controller is responsive to the call request signal received via the access unit of the second service zone for transmitting a disconnect signal to the access unit of the first service zone for clearing the channel established therefrom to the cordless station for readying to receive signals in a standby mode.

BRIEF DESCRIPTION OF THE DRAWINGS

The present invention will be described in further detail with reference to the accompanying drawings, in which:

FIG. 5 shows instructions programmed in the controller of cordless stations according to a first embodiment of this invention;

FIG. 9 shows instructions programmed in the controller of cordless stations according to a second embodiment of this invention;

FIG. 12 shows a sequence of signals useful for describing the operation of the system according to the second embodiment of this invention.

DETAILED DESCRIPTION

Figure 1:
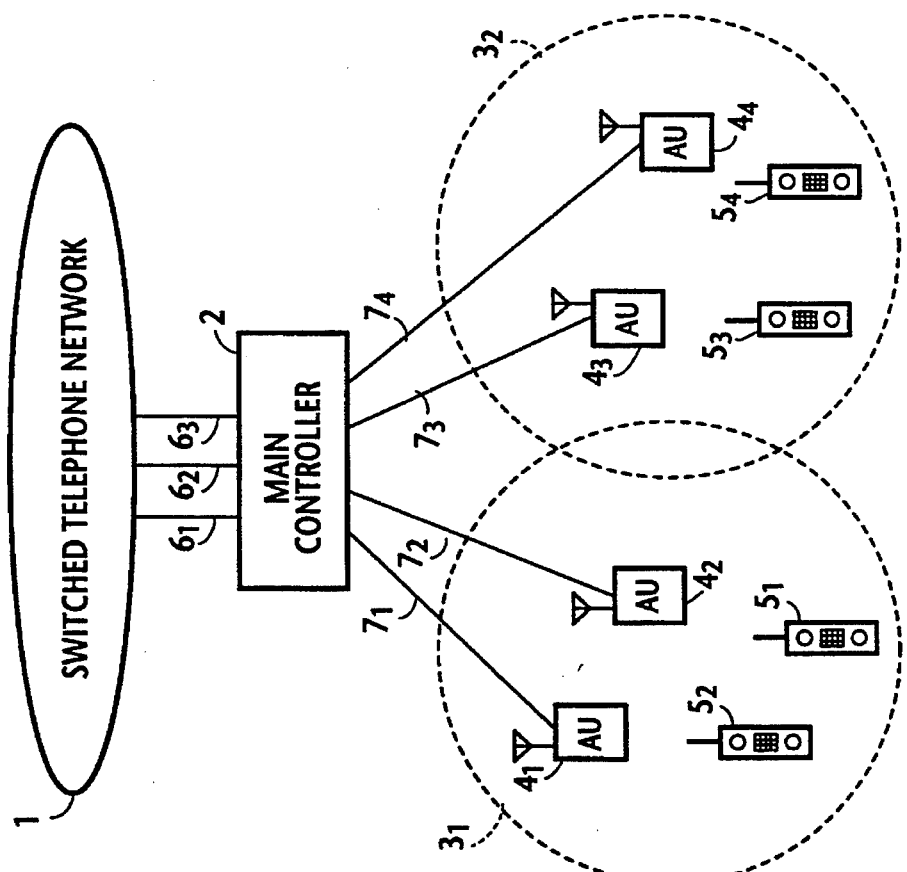
FIG. 1 shows in block form a cordless key telephone system embodying the present invention.

Referring now to FIG. 1, there is shown a cordless key telephone system according to the present invention. The system includes a main controller 2 connected to the public or private telephone network 1 via three subscriber lines $6_1$ through $6_3$, for example. Main controller 2 is further connected by local lines $7_1 \sim 7_4$ to access units $4_1 \sim 4_4$ which are divided into groups corresponding to service zones $3_1$ and $3_2$ and located at strategic points of the corresponding service zones. The system has four cordless stations $5_1$ through $5_4$, for example, which may roam across the boundaries between service zones $3_1$ and $3_2$. A two-way control channel is provided between the access units and cordless stations. During standby modes, all access units and cordless stations are switched to the control channel to constantly monitor signals carried thereon. During a call origination or termination phase, the control channel is used to exchange control signals to assign a two-way speech channel.

The frequency spectrum of the radio signals used in the system is equally divided at 12.5-kHz intervals into 89 (eighty-nine) telephone channels each with a bandwidth of 3 kHz. In order to avoid interference between control signals and speech signals due to third-order intermodulation distortion, service zone $3_1$ is permanently assigned an even-numbered control channel, say, channel #46 and a plurality of odd-numbered speech channels (channel #1 to channel #87), while zone $3_2$ is permanently assigned an odd-numbered control channel, say, channel #89, and a plurality of even-numbered speech channels (channel #2 to channel #88) with the exception of channel #46.

Figure 2:
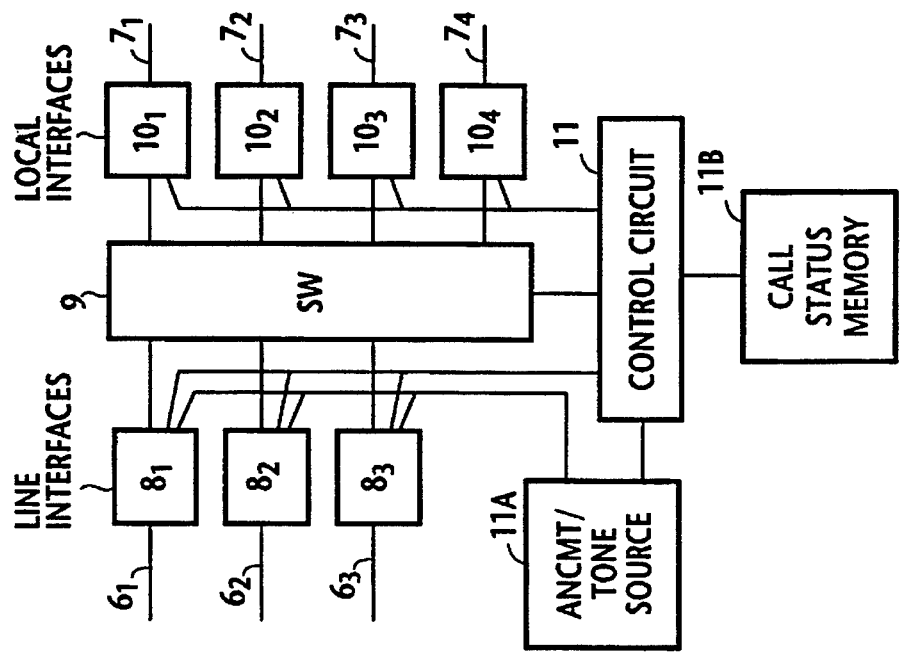
FIG. 2 shows details of a main controller.

As shown in FIG. 2, main controller 2 comprises line interfaces $8_1 \sim 8_3$ respectively coupled via subscriber lines $6_1 \sim 6_3$ to the network 1, local interfaces $10_1 \sim 10_4$ respectively coupled to local lines $7_1 \sim 7_4$, and a switching matrix 9 for establishing a connection between the interfaces 8 and 10. A control circuit 11 is coupled to all interfaces 8 and 10 to supply a switching control signal to matrix 9. An announcement source 11A is connected to all line interfaces 8 to supply a melodious tone and voiced announcement when an exchange line is kept in a line-hold condition in a manner as will be described. Control circuit 11 is connected to a call status memory 11B in which relationships between calls, exchange lines, access units and cordless stations are stored. Using the contents of call status memory 11 B, control circuit 11 controls the switching matrix 9.

Figure 3:
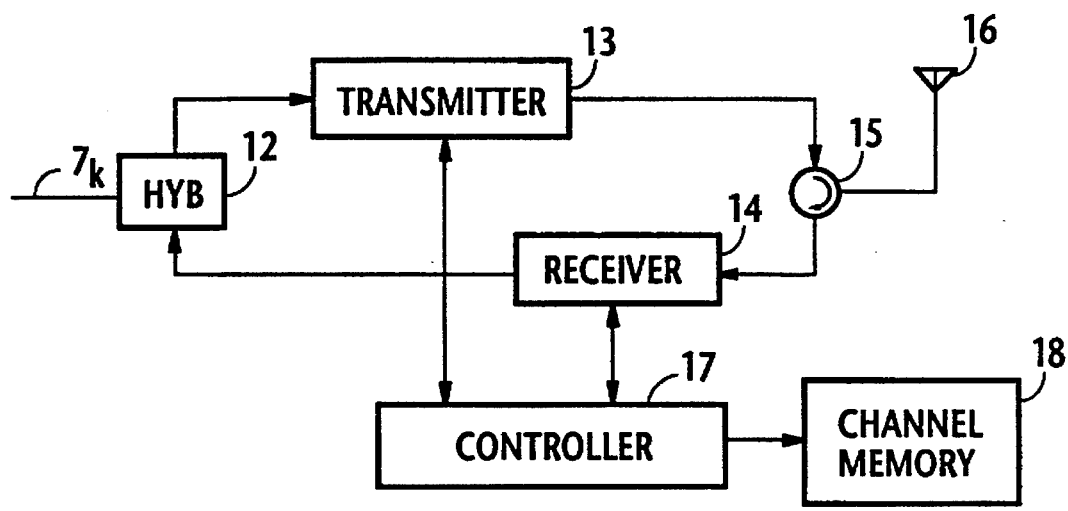
FIG. 3 shows details of an access unit.

As illustrated in FIG. 3, each access unit $4_k$ includes a hybrid 12 having its two-wire circuit coupled to the associated local line $7_k$. The transmit portion of the four-wire circuit is coupled to the input of a transmitter 13, the receive portion of the four-wire circuit being coupled to the output of a receiver 14. The output of transmitter 13 is coupled via a diplexer 15 to an antenna 16 for transmission to cordless stations. Signals received by antenna 16 from cordless stations are coupled by diplexer 15 to the input of receiver 14 for transmission to main controller 2. A frequency synthesizer is included in transmitter 13 and receiver 14 to receive control signals transmitted on the control channel from both sides of the access unit for coupling to a control circuit 17. In a manner to be described, control circuit 17 processes the received control signals for transmission to either side of the unit using a channel memory 18 in which the status of the control channel of the own zone and the status of all speech channels of the zone are stored. Each alert signal contains a system identifier and a cordless-station identifier. The frequency synthesizers of access units $4_1$ and $4_2$ are tuned to channel #46 during standby mode readying to receive signals and those of access units $4_3$ and $4_4$ are tuned to channel #89 during standby mode.

Figure 4:
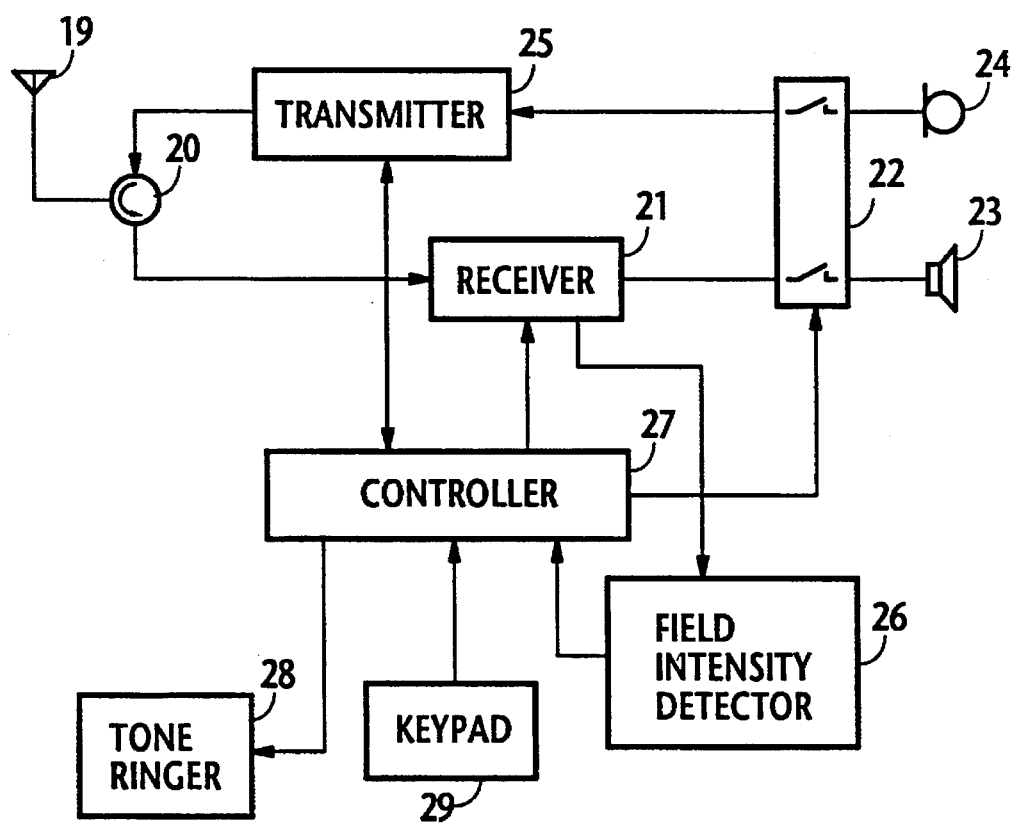
FIG. 4 shows details of a cordless station.

In FIG. 4, signal from the nearby access unit is detected by an antenna 19 of each cordless station $5_k$ and passed through a diplexer 20 to a receiver 21 where it is converted to an audio-frequency signal and applied through a normally open switching circuit 22 to an earphone 23. Signal from microphone 24 is coupled through switching circuit 22 to a transmitter 25 where it is converted to a high-frequency signal and applied through diplexer 20 to antenna 19. A field intensity detector 26 is connected to receiver 21 to compare the field intensity of the cordless station with a prescribed threshold and applies an output signal to a control circuit 27 if the field intensity is higher than the threshold. As will be described, control circuit 27 exchanges control signals with receiver 21 and transmitter 25 by successively tuning their frequency synthesizers to specified control channels and switching to an idle speech channel when it is assigned by the communicating access unit. A tone ringer 28 is connected to control circuit 27 to audibly alert the user upon receipt of an incoming call from the network. A keypad 29 is also connected to control circuit 27 to generate an off-hook signal when answering an incoming call or generate a call request as well as destination address information when originating an outgoing call.

Each of the respective control circuits of main controller 2, access units 4 and cordless stations 5 is a microprocessor-based controller which is programmed to perform a stored sequence of instructions as described hereinbelow.

FLOWCHARTS OF THE FIRST EMBODIMENT

A first embodiment of the present invention will now be described with reference to flowcharts shown in FIGS. 5 to 7.

In FIG. 5, during a talking mode with a distant station via an exchange line, the program execution of the controller 27 of a cordless station starts with decision step 30 to check the output of field intensity detector 26 to see if the field intensity is lower than an acceptable level. If this is the case, detector 26 generates an output and the program branches at step 30 to step 31 to switch the cordless station to the other control channel of the system to transmit a zone switching signal identifying the cordless station. The program proceeds to step 32 to switch the cordless station to the other control channel of the system, i.e., the control channel of a second zone to which the cordless station is about to enter, and moves ahead to step 33 to wait for an alert signal. If the system has three or more control channels assigned respectively to different zones, control channels of other zones may be scanned to detect one having highest intensity as the control channel of the second zone and the zone switching signal may further contain an identifier indicating the control channel of the second zone.

As will be described, this zone switching signal is received by the access unit of a first zone and relayed to main controller 2. On receiving this zone switching signal, main controller 2 returns a disconnect signal to the access unit of the first zone, and then transmits an alert signal to one of the access units of a second zone.

The alert signal is relayed from the access unit of the second zone to the cordless station in which it is detected at step 33. The program branches at step 33 to step 34 to transmit an acknowledgment (ACK) signal to the new access unit.

On receiving this ACK signal, the access unit of the second zone returns a channel assignment signal to the cordless station, containing a channel identifier indicating a speech channel and the identifier of that cordless station to which the speech channel is to be assigned.

The program proceeds to step 35 to check to see if a channel assignment signal is received. If this signal is not received within a specified period, control returns to step 34 to retransmit the acknowledgment signal. On receiving a channel assignment signal, the program branches at step 35 to step 36 to switch the cordless station to the assigned speech channel and transmits a switching complete signal to the access unit of the second zone (step 37).

The switching complete signal is relayed by the access unit of the second zone to the main controller to cause it to transmit a turn-on signal.

Control advances to step 38 to wait for the turn-on signal. If this turn-on signal is not received within a specified period, control-returns to step 37 to retransmit the switching complete signal. On receiving this turn-on signal, cordless station operates switch 22 to reestablish a connection through the access unit to the main controller.

Figure 6A:
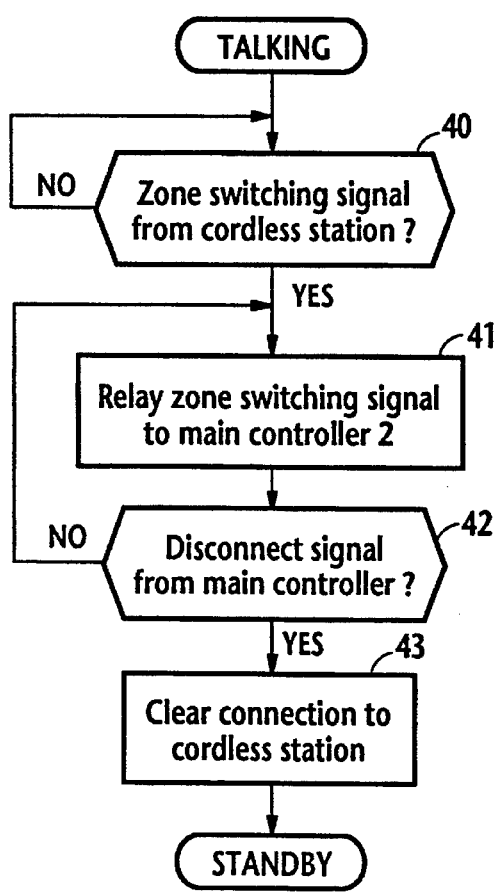
FIG. 6 shows instructions programmed in the controller of access units according to the first embodiment of this invention.

In FIG. 6A, with a connection being established between a cordless station and an exchange line the program execution of the access unit 4 that is involved in the connection begins with decision step 40 to check for the presence of a zone switching signal from the cordless station. If the answer is affirmative, the program branches at step 40 to step 41 to relay the received zone switching signal to main controller 2 and goes to step 42 to wait for a disconnect signal from the main controller.

As will be described, main controller 2 responds to the zone switching signal by returning a disconnect signal to the access unit of the first zone. On receiving it, the program at the access unit branches at step 42 to step 43 to clear the connection to the cordless station, leaving the access unit in a standby state.

Figure 6B:
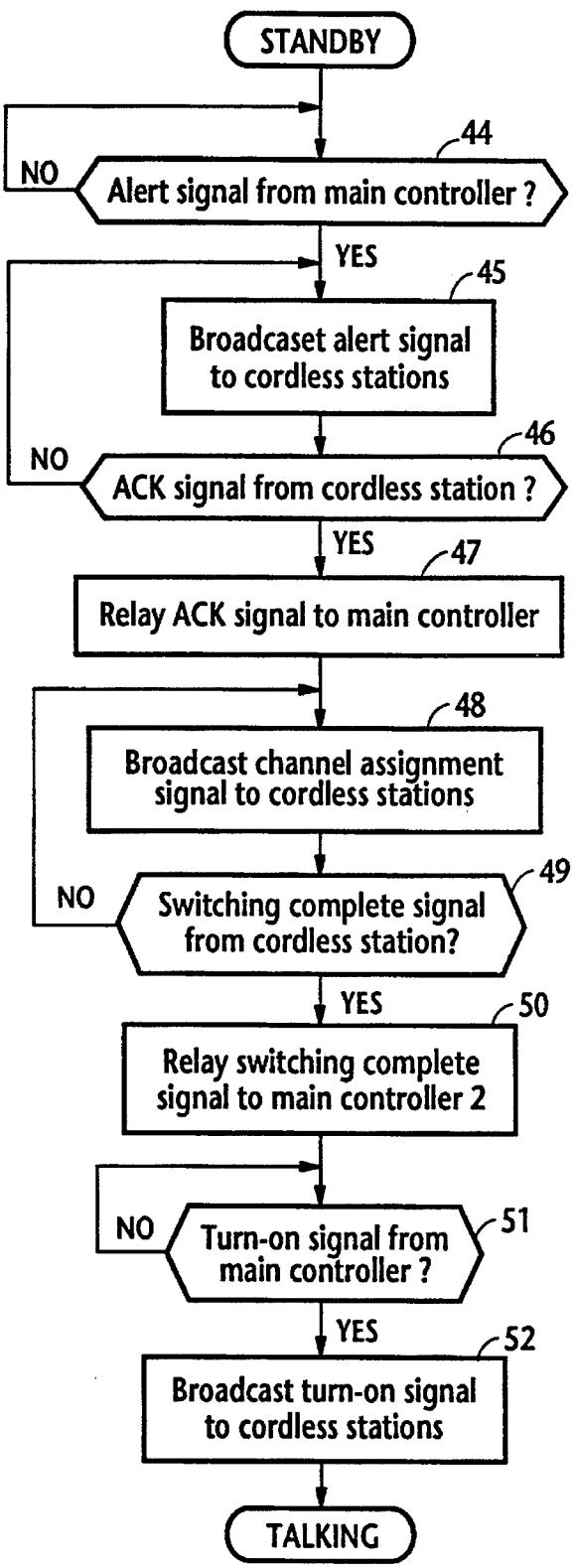

In FIG. 6B, when an access unit is in a standby state, the program execution starts with decision step 44 to check for the reception of an alert signal from the main controller. This alert signal contains the identifier of the cordless station crossing a zone boundary. If there is one, control branches at step 44 to step 45 to broadcast the alert signal, and goes to step 46 to wait for an acknowledgment signal returning from the addressed cordless station. This alert signal will be received by that cordless station and an acknowledgment signal will be returned therefrom. If the acknowledgment signal is not returned within a specified period, control branches to step 45 to rebroadcast the alert signal.

On receiving the acknowledgment signal, the program branches at step 46 to step 47 to relay the acknowledgment signal to the main controller and proceeds to step 48 to scan all speech channels to select an idle channel and broadcast a channel assignment signal identifying the cordless station to which the selected idle speech channel is to be assigned and the identifier of the selected channel. Control exits to step 49 to wait for a switching complete signal returning from the cordless station.

The cordless station will respond to the channel assignment signal from the access unit by reestablishing a link to the assigned speech channel and returning a switching complete signal to the access unit. If the switching complete signal is not received within a specified period, the program branches at step 49 to step 48 to repeat the transmission of the channel assignment signal.

In response to receipt of a switching complete signal, the program at the access unit branches at step 49 to step 50 to relay it to the main controller and moves to step 51 to wait for a turn-on signal from the main controller.

The program of the access unit now branches to step 52 to broadcast the received turn-on signal to all cordless stations so that the cordless station entering the second zone is allowed to establish a speech path to enter a talking mode again with the exchange line.

Figure 7:
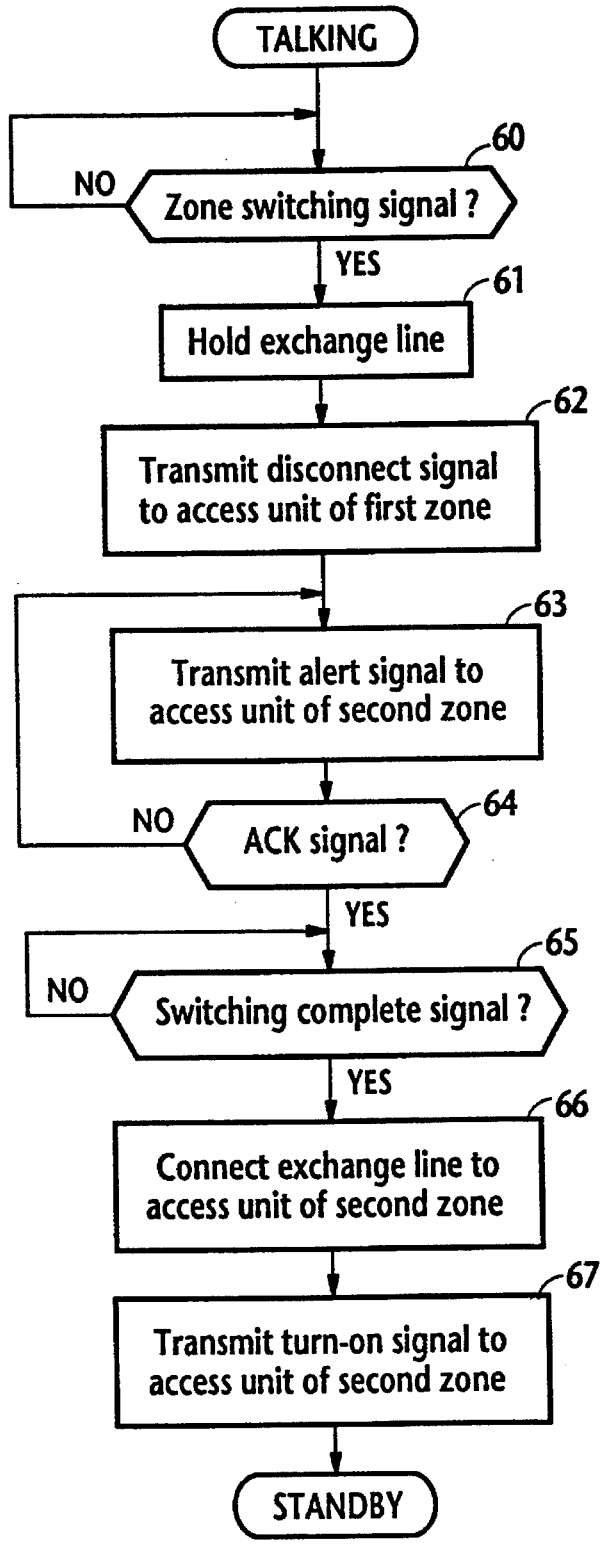
FIG. 7 shows instructions programmed in the main controller according to the first embodiment of this invention.

In FIG. 7, when a cordless station is in a talking mode through an exchange line, the program execution of main controller 2 begins with decision step 60 to check for the presence of a zone switching signal from the access unit through which the talking connection has been established. If there is one, control branches at step 60 to step 61 to hold the exchange line which is identified by a record in the call status memory 11B as corresponding to the cordless station from which the zone switching signal has been received, and applies a musical tone or a vocal announcement to the exchange line, indicating to the distant user that the keytelephone user is now crossing a zone boundary and the connection will be briefly interrupted. Exit then is to step 62 to return a disconnect signal to the access unit to allow it to clear the connection with the cordless telephone. The program then proceeds to step 63 to select one of the access units of the second zone and transmit an alert signal to the selected access unit. Exit then is to step 64 to check to see if an acknowledgment signal is received from the access unit of the second zone. If an acknowledgment signal is not received within a specified period, step 63 is repeated to retransmit the alert signal. If the answer is affirmative in step 64, control branches to decision step 65 to wait for a switching complete signal from the cordless station via the access unit. If there is one, the program branches to step 66 to connect the exchange line to the access unit of the second zone and proceeds to step 67 to transmit a turn-on signal to the access unit.

OPERATION OF THE FIRST EMBODIMENT

Figure 8:
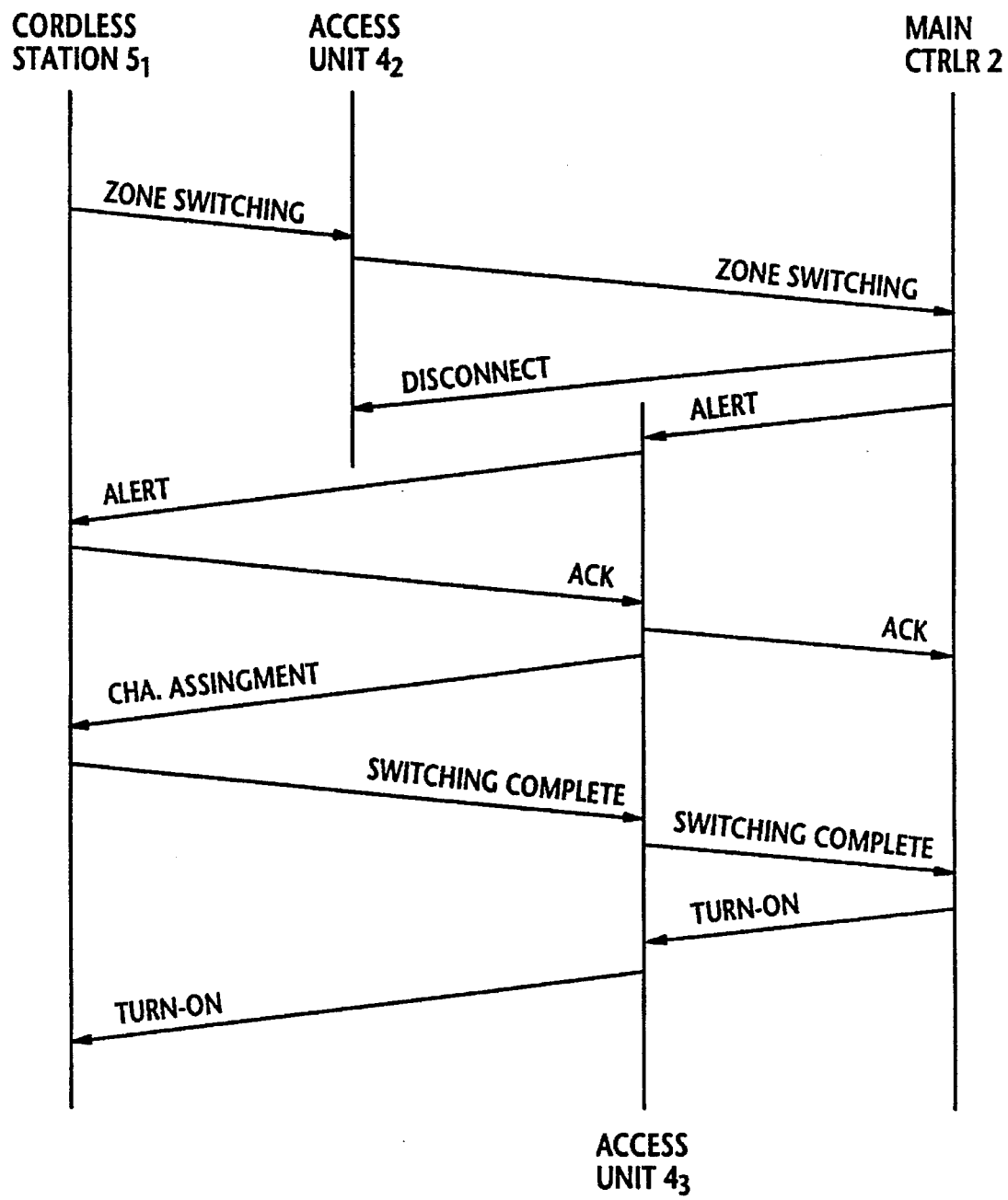
FIG. 8 shows a sequence of signals useful for describing the operation of the system according to the first embodiment of this invention.

The operation of the first embodiment of the system will now be described with reference to the drawings described above together with FIG. 8. Assume that cordless station $5_1$ is in a talking mode with exchange line $6_1$ by way of access unit $4_2$ and is leaving zone $3_1$ and entering second zone $3_2$. When a low field intensity condition is detected (step 30, FIG. 5), a zone switching signal is transmitted (step 31) from station $5_1$ and received and relayed by access unit $4_2$ (steps 40 and 41, FIG. 6A) to main controller 2. Main controller 2 receives the zone switching signal (step 60, FIG. 7) and determines from the contents of call status memory 11B that exchange line $6_1$ (step 61) is being connected to cordless station $5_1$ and holds the line in an announcement mode and transmits a disconnect signal to access unit $4_2$ (step 62). On receiving this disconnect signal, access unit $4_2$ clears the connection to cordless station $5_1$ (steps 42, 43, FIG. 6A). Following the transmission of the disconnect signal, main controller 2 selects an access unit $4_3$ and applies to it an alert signal identifying cordless station $5_1$ (step 63, FIG. 7). This alert signal is received and broadcast by access unit $4_3$ (steps 44, 45, FIG. 6B) and finally received by cordless station $5_1$ (step 33, FIG. 5). Cordless station $5_1$ returns an ACK signal (step 34), which is received and relayed by access unit $4_3$ (step 47) to main controller 2 (step 64). Main controller 2 reconnects the exchange line $6_1$ to access unit $4_3$.

Meanwhile, access unit $4_3$ scans the speech channels of zone $3_2$ to select an idle channel and broadcasts a channel assignment signal identifying the selected channel and the cordless station $5_1$ (step 48). The channel assignment signal is received by cordless station $5_1$ (step 35) and cordless station $5_1$ is switched to the assigned speech channel (step 36) to establish a connection between cordless station $5_1$ and access unit $4_3$. A switching complete signal is then transmitted from cordless station $5_1$ (step 37) to access unit $4_3$ and relayed to main controller 2 (steps 49, 50). Main controller 2 now connects the exchange line $6_1$ to access unit $4_3$ (step 66) and transmits a turn-on signal (step 67) to access unit $4_3$, which, in turn, broadcasts it to cordless stations (steps 51, 52). Cordless station $5_1$ responds to this turn-on signal by activating switch 22 and reestablishes the talking connection with the distant station via the exchange line $6_1$ (steps 38 and 39, FIG. 5).

FLOWCHARTS OF THE SECOND EMBODIMENT

A second embodiment of the present invention will now be described with reference to flowcharts shown in FIGS. 9 to 11.

In FIG. 9, during a talking mode with an exchange line the program execution of a cordless station starts with decision step 70 to check to see if the field intensity is reduced to a level which indicates that the cordless station is leaving a first zone in which the talking connection has been established and entering a second zone. If the answer is affirmative, program branches at step 70 to step 71 to switch the cordless station to the control channel of the first zone and transmit a zone switching signal.

As will be described, the zone switching signal is received by the access unit of the first zone and relayed to the main controller in which the call status memory is accessed to detect an exchange line with which the cordless station is in talking mode. The main controller keeps the exchange line in an announcement-hold mode in a manner identical to the first embodiment by coupling the announcement source 11A to the line interface with which the exchange is connected.

Control then proceeds to step 72 to check to see if the control channel of the second zone is idle. If the answer is affirmative, the program branches at step 72 to step 73 to switch the cordless station to the control channel of the second zone and transmit a call request signal to one of the access units of the second zone which is selected by the main controller, with the call request signal containing the cordless station identifier and the control channel identifier of the second zone. Control moves ahead to step 74 to wait for a channel assignment signal.

As will be described, the call request signal from the cordless station is relayed by the selected access unit to the main controller, whereupon it returns a disconnect signal to the access unit of the first zone to allow it to clear the connection to the cordless station. Meanwhile, the access unit of the second zone broadcasts a channel assignment signal.

On receiving the channel assignment signal, the program of the cordless station branches at step 74 to step 75 to switch the station to an idle speech channel specified by the channel assignment signal. The program then proceeds to step 76 to transmit a switching complete signal to the access unit of the second zone, and goes to step 77 to wait for a turn-on signal from the main controller via the access unit. When the turn-on signal is received by the cordless station, the program branches at step 77 to step 78 to turn on the speech circuit switch 22 to reestablish the talking connection.

Figure 10A:
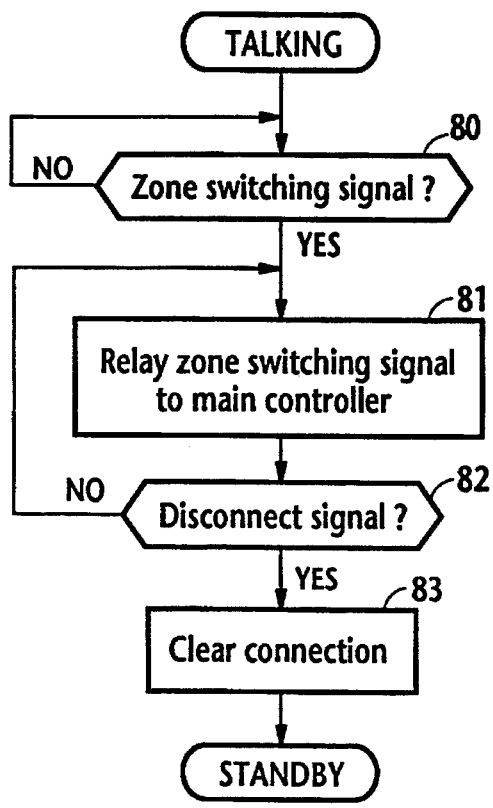
FIG. 10 shows instructions programmed in the controller of access units according to the second embodiment of this invention.

In FIG. 10A, with a connection being established between a cordless station and an exchange line the program execution of the access unit that is involved in the connection begins with decision step 80 to check for the presence of a zone switching signal from the cordless station. If the answer is affirmative, the program branches at step 80 to step 81 to relay the received zone switching signal to main controller 2 and goes to step 82 to wait for a disconnect signal from the main controller. On receiving the disconnect signal, the program branches at step 82 to step 83 to clear the connection to the cordless station, leaving the access unit in a standby state.

Figure 10B:
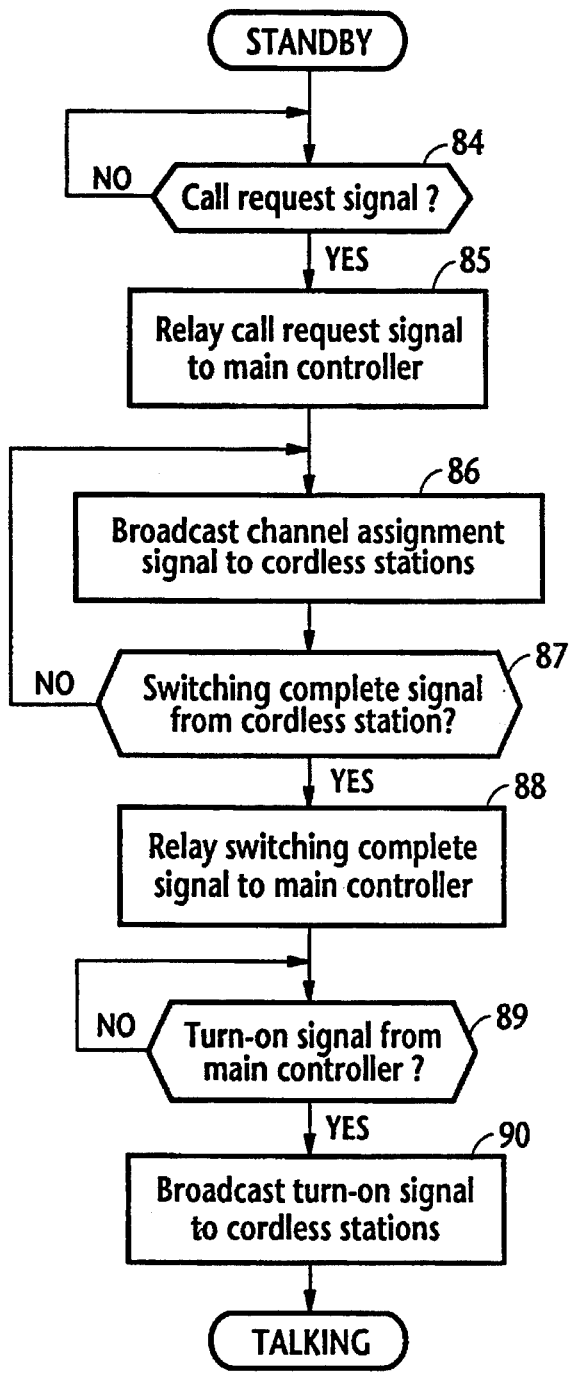

In FIG. 10B, when an access unit is in a standby mode, the program execution starts with decision step 84 to check for the reception of a call request signal from a cordless station. If there is one, control branches at step 84 to step 85 to broadcast the relay the call request signal to the main controller, and goes to step 86 to scan all speech channels to select an idle channel and broadcast a channel assignment signal identifying the cordless station to which the selected idle speech channel is to be assigned and the selected channel identifier. Control exits to step 87 to wait for a switching complete signal from the cordless station. On receiving it, control branches to step 88 to relay the received signal to the main controller and goes to decision step 89 to check for the reception of a turn-on signal from the main controller. When this signal is received, the program branches at step 89 to step 90 to broadcast the turn-on signal to cordless stations.

Figure 11:
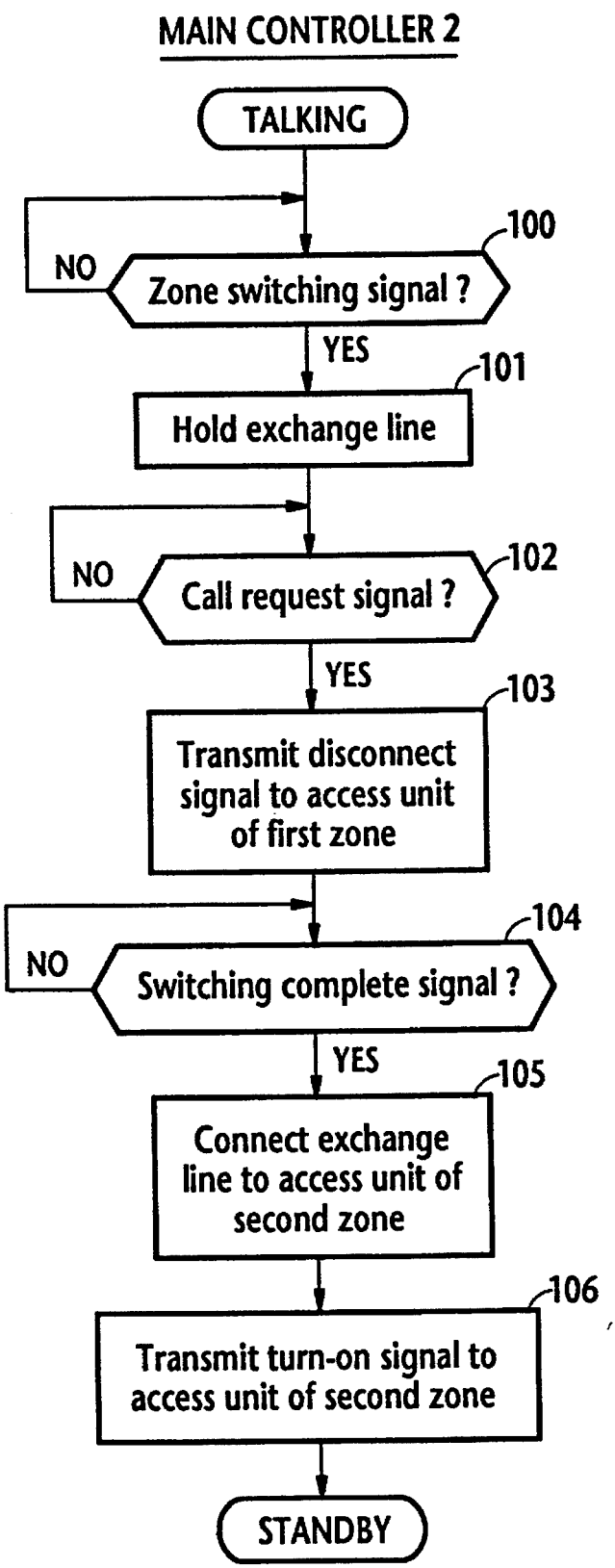
FIG. 11 shows instructions programmed in the main controller according to the second embodiment of this invention.

In FIG. 11, when a cordless station is in a talking mode through an exchange line, the program execution of main controller 2 begins with decision step 100 to check for the presence of a zone switching signal from the access unit through which the talking connection has been established. If there is one, control branches at step 100 to step 101 to hold the exchange line which is identified by the call status memory of controller 11 as corresponding to the cordless station from which the zone switching signal has been received, and applies a musical tone or a vocal announcement to the exchange line, indicating to the distant user that the key-telephone user is now leaving a first zone and entering a second zone and the connection will be briefly interrupted. Exit then is to decision step 102 to wait for a call request signal from the cordless station by way of an access unit of the second zone. On receiving the call request signal, the program branches at step 102 to step 103 to transmit a disconnect signal to the access unit of the first zone to allow it to clear the connection with the cordless station which has left the first zone. Exit then is to step 104 to check to see if a switching complete signal is received from the access unit of the second zone. If the answer is affirmative in step 104, control branches to step 1 05 to connect the exchange line to the access unit and exits to step 106 to transmit a turn-on signal to the access unit of the second zone.

OPERATION OF THE SECOND EMBODIMENT

The operation of the second embodiment of the system will now be described with reference to FIGS. 9–12. As in the case of the first embodiment, it is assumed that cordless station $5_1$ is in a talking mode with exchange line $6_1$ by way of access unit $4_2$ and is leaving first zone $3_1$ and entering second zone $3_2$. When a low field intensity condition is detected (step 70, FIG. 9), a zone switching signal is transmitted (step 71) from station $5_1$ and received and relayed by access unit $4_2$ (steps 80 and 81, FIG. 10A) to main controller 2. Main controller 2 receives the zone switching signal (step 100, FIG. 11) and determines from the call status memory of controller 11 that exchange line $6_1$ (step 101) is being connected to cordless station $5_1$ and holds the line in an announcement mode. When cordless station $5_1$ has entered the second zone, the field intensity of the control channel of the second zone detected by the station will become higher than a specified level (step 72) and a call request signal is sent from cordless station $5_1$ to access unit $4_3$ (step 73). The call request signal is relayed by access unit $4_3$ (steps 84, 85, FIG. 10B) to the main controller, whereupon it proceeds to transmit a disconnect signal to access unit $4_2$ (steps 102 and 103, FIG. 11 ). On receiving this disconnect signal, access unit $4_2$ clears the connection to cordless station $5_1$ (steps 82, 83, FIG. 10A).

Meanwhile, access unit $4_3$ responds to the call request signal from station $5_1$ by scanning speech channels of the second zone and selects one of the idle channels and broadcasts a channel assignment signal. Cordless station $5_1$ receives this signal (step 74) and switches to the assigned speech channel (step 75). A switching complete signal is then transmitted from cordless station $5_1$ to access unit $4_3$ (step 76) and relayed to main controller 2 (steps 87, 88). In response to the switching complete signal (step 104), main controller 2 connects the exchange line $6_1$ to access unit $4_3$ (step 105) and transmits a turn-on signal (step 106) to access unit $4_3$, which, in turn, broadcasts it to cordless stations (steps 89, 90). Cordless station $5_1$ responds to this turn-on signal by activating switch 22 and reestablishes the talking connection with the distant station via the exchange line $6_1$ (steps 77, 78, FIG. 9).

What is claimed is:

1. A method for switching zones in a cordless key telephone system serving at least first and second zones, the system comprising first and second access units respectively located in the first and second zones, and a main controller for selectively establishing one of a first switched connection between an exchange line and the first access unit and a second switched connection between the exchange line and said second access unit, the method comprising the steps of:

a) establishing a first speech channel between a cordless station and the first access unit and coupling the first speech channel via said first switched connection to said exchange line;

b) constantly monitoring a field intensity of the first speech channel at said cordless station;

c) transmitting a zone switching signal from the cordless station to the first access unit when the field intensity falls below a specified level;

d) relaying the zone switching signal via the first access unit to the main controller;

e) responsive to the relayed zone switching signal, holding said exchange line at said main controller, applying a vocal announcement to said exchange line indicating to a communicating party that the cordless station is switching zones, transmitting a disconnect signal from the main controller to the first access unit to clear said first-speech channel, and transmitting an alert signal from the main controller via said second access unit to the cordless station to cause the cordless station to return an acknowledgement signal;

f) responsive to the acknowledgement signal from the cordless station, transmitting a channel assignment signal from the second access unit to the cordless station, and relaying the acknowledgement signal via the second access unit to the main controller;

g) responsive to the channel assignment signal, establishing a second speech channel between the cordless station and the second access unit and returning a switching complete signal from the cordless station to the second access unit;

h) relaying the switching complete signal via the second access unit to the main controller; and i) responsive to the relayed acknowledgement signal and the relayed switching complete signal, establishing said second switched connection and coupling the second speech channel to the exchange line via said second switched connection.

2. A method for switching zones in a cordless key telephone system serving at least first and second zones, the system comprising first and second access units respectively located in the first and second zones, and a main controller for selectively establishing one of a first switched connection between an exchange line and said first access unit and a second switched connection between said exchange line and said second access unit, the method comprising the steps of:

a) establishing a first speech channel between a cordless station and the first access unit and coupling the first speech channel via said first switched connection to said exchange line;

b) constantly monitoring a field intensity of the first speech channel at said cordless station;

c) transmitting a zone switching signal from the cordless station to the first access unit when the field intensity falls below a specified level, and transmitting a call request signal from the cordless station to the second access unit;

d) relaying the zone switching signal via the first access unit to the main controller;

e) responsive to the relayed zone switching signal, holding said exchange line at said main controller, and applying a vocal announcement to said exchange line indicating to a communicating party that the cordless station is switching zones;

f) relaying the call request via the second access unit to the main controller and transmitting a channel assignment signal for the second access unit to the cordless station;

g) responsive to the relayed call request signal, transmitting a disconnect signal from the main controller to the first access unit to clear said first speech channel, and responsive to the channel assignment signal, establishing a second speech channel between the cordless station and the second access unit and transmitting a switching complete signal from the cordless station to the second access unit;

h) relaying the switching complete signal via the second access unit to the main controller; and i) responsive to the relayed switching complete signal, establishing said second switched connection and coupling the second speech channel to the exchange line via said second switched connection.

\* \* \* \* \*

UNITED STATES PATENT AND TRADEMARK OFFICE
CERTIFICATE OF CORRECTION

PATENT NO.   : 5,454,028
DATED        : September 26, 1995
INVENTOR(S)  : Toshihiro HARA, Shinji KUMATAKA, Kosuke HASHIMOTO and Ichiro TAMURA It is certified that error(s) appears in the above-identified patent and that said Letters Patent is hereby corrected as shown below:

Col. 9, line 10, delete "1 05" and insert --105--.

Signed and Sealed this

Twenty-fifth Day of June, 1996

*Attest:*

BRUCE LEHMAN

*Attesting Officer*    *Commissioner of Patents and Trademarks*